July 22, 1924.
O. T. UMBENHOWER
SCREEN FOR AUTOMOBILE HEADLIGHTS
Filed Feb. 8, 1923
1,502,282
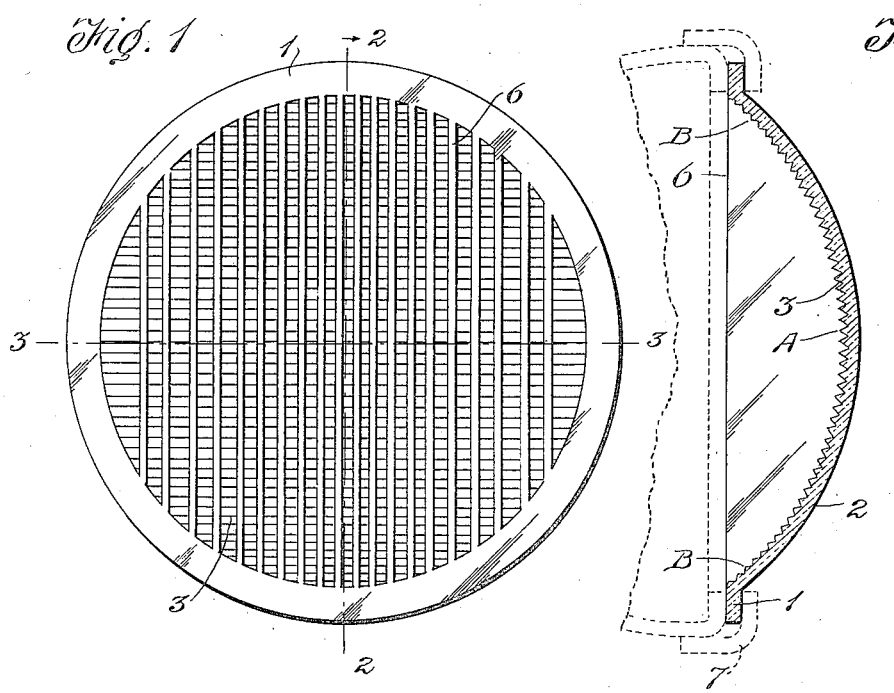
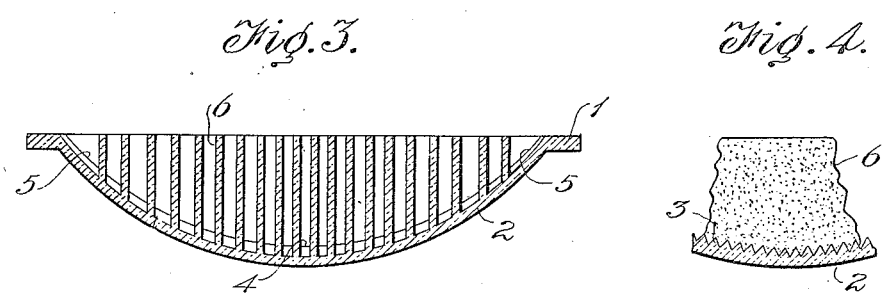
Inventor
Oras T. Umbenhower,
By Eccleston & Eccleston.
Attorneys Patented July 22, 1924.

1,502,282

UNITED STATES PATENT OFFICE.

ORAS T. UMBENHOWER, OF GARRETT, INDIANA.

SCREEN FOR AUTOMOBILE HEADLIGHTS.

Application filed February 8, 1923. Serial No. 617,817.

*To all whom it may concern:*

Be it known that I, ORAS T. UMBENHOWER, a citizen of the United States, residing at Garrett, in the county of De Kalb and State of Indiana, have invented certain new and useful Improvements in Screens for Automobile Headlights, of which the following is a specification.

The object of my invention is to provide a lens for an automobile or similar headlight which will prevent rays from the light source from being projected to the sides thereof, thereby eliminating the glaring effect produced by the ordinary headlight and its lens.

Another object of the invention is the provision of a non-glare screen for automobile headlights which will dim the light at the sides thereof without appreciably diminishing its illuminating properties in the direct path of the machine.

A further object of the invention is the provision of a screen for automobile headlights which will eliminate the blinding effect at the sides of the automobile while concentrating the light on the road directly in front of the machine.

I attain these objects by the means illustrated in the accompanying drawing in which—

Fig. 1 is a front view of the headlight lens and screen;

Fig. 2 is a vertical section thereof;

Fig. 3 is a horizontal section thereof and

Fig. 4 is a fragmentary vertical section showing a diffusing face of a screen element.

The headlight lens as a whole, designated by the numeral 1, has a curvature of a section of a spheroid, as shown at 2. The inner surface of the lens is provided with horizontal prismatic elements 3, preferably integral therewith; these prismatic elements are of greatest thickness at the center of the lens, as shown at 4, and gradually taper in a horizontal direction toward the outer edges, as indicated at 5, in order that the light from the source will be generally refracted toward a focus, each prismatic element thus acting as a concavo-convex lens. The prisms constituting the inner surface of the lens are deepest at the center of the lens and decrease in depth toward the top and bottom, as shown at A and B respectively.

On the inner face of the headlight lens are also provided a series of vertical panels 6, the two central panels being disposed equally distant from the central vertical line of the lens; the space between the two central panels being the least, while the spaces between the other adjacent panels on both sides of the central panels gradually increase in extent toward the outer edges of the lens, as clearly shown on the drawing. These vertical panels serve as screens to prevent rays from the light source from being projected to the sides of the headlight, thereby blinding a pedestrian or the driver of an approaching automobile. These panels are preferably formed from glass integral with the lens, the light rays from the source being reflected and refracted thereby, so that only a portion of the projected light will pass out to the sides of the headlight. One face of each of these panels is coated with reflecting material in order to aid in the reflection of the rays of light reaching it. In case it is desired to diffuse the light instead of reflect it, one face of each of the panels may be ground. The light from the source impinging upon these screen members is not transmitted therethrough to any material extent even if one of the faces is a diffusing surface, the danger of blinding a passing pedestrian or driver being thereby eliminated. In the preferred form of the device, the surfaces of the panels are polished on the side toward the centre of the device and ground or coated with non-reflecting material on the opposite surface, this non-reflecting or ground face being shown in Fig. 4.

The lens is provided with the usual curved frame 7 by means of which it is held on the headlight reflector.

What I claim and desire to secure by Letters Patent is:—

1. A screen device for headlights comprising a lens, a series of parallel faced integral panels extending vertically from the inner face of the lens, said panels reflecting rays of light impinging thereon but preventing their passage therethrough.

2. A non-glare device for automobile headlights, comprising a lens, horizontally disposed prisms on one face of said lens, and vertical disposed panels mounted on said lens, said panels being light dimming.

3. In an automobile headlight lens, horizontally disposed prisms extending from one surface of said lens, said prisms being of greatest depth and thickness at the center and decreasing toward the circumference of the lens, and light reflecting panels extending vertically of said lens.

In testimony whereof I affix my signature.

ORAS T. UMBENHOWER.